United States Patent
Jegou et al.

(10) Patent No.: US 8,687,899 B2
(45) Date of Patent: Apr. 1, 2014

(54) ASSISTANCE DEVICE FOR IMAGE RECOGNITION

(75) Inventors: Herve Jegou, Meylan (FR); Cordelia Schmidt, Saint Ismier (FR); Matthijs Douze, Saint Martin D'heres (FR)

(73) Assignee: Inria Institut National de Recherche en Informatique et en Automatique, Le Chesnay (FR)

( * ) Notice: Subject to any disclaimer, the term of this patent is extended or adjusted under 35 U.S.C. 154(b) by 463 days.

(21) Appl. No.: 12/999,560

(22) PCT Filed: Jun. 12, 2009

(86) PCT No.: PCT/FR2009/000702
§ 371 (c)(1),
(2), (4) Date: Mar. 21, 2011

(87) PCT Pub. No.: WO2009/153445
PCT Pub. Date: Dec. 23, 2009

(65) Prior Publication Data
US 2011/0164822 A1    Jul. 7, 2011

(30) Foreign Application Priority Data

Jun. 16, 2008 (FR) ..................... 08 03345

(51) Int. Cl.
*G06K 9/62* (2006.01)
*G06K 9/68* (2006.01)
*G06K 9/70* (2006.01)

(52) U.S. Cl.
USPC .......................... 382/224; 382/225; 382/226

(58) Field of Classification Search
None
See application file for complete search history.

(56) References Cited

FOREIGN PATENT DOCUMENTS

WO    WO-0225588 A2    3/2002

OTHER PUBLICATIONS

Matsakis et al., "The use of force histograms for affine-invariant relative position description", Jan. 2004, IEEE Transaction on Pattern Analysis and Machine Intelligence, vol. 26, No. 1.*
Daniel Martin Keysers, "Modeling of Image Variability for Recognition", 2006.*
Daniel Martin Keysers, "Modeling of Image Variability of Recognition", 2006.*

(Continued)

*Primary Examiner* — Amir Alavi
*Assistant Examiner* — Kenny Cese
(74) *Attorney, Agent, or Firm* — Rader, Fishman & Grauer PLLC

(57) ABSTRACT

The present disclosure relates to an assistance device for image recognition that comprises a memory storing sets of image descriptors, respectively associated with an image area and including first vector data, second angle data, and third scale data. A first operator receives a designation of two descriptors and establishes a Boolean representing a check of a similarity criterion of the descriptor vectors from a comparison among first data. A second operator receives a designation of two descriptors and establishes a rotation angle parameter from the second data. A third operator receives a designation of two descriptors and establishes a scale factor parameter from the third data. A controller receives the designations of first and second sets of descriptors and applies the first operator to each pair including a descriptor of the first set and a descriptor of the second set in order to derive a list of similar descriptor pairs, calls the second operator and the third operator for each of said pairs and for storing the group of parameters thus obtained, as well as an estimator of the resemblance of the images of the first and second sets using a statistic processing of said parameters.

22 Claims, 12 Drawing Sheets

(56) References Cited

OTHER PUBLICATIONS

Alexis Joly et al., Publication entitled "Content-Based Copy Retrieval Using Distortion-Based Probabilistic Similarity Search," published in IEEE Transactions On Multimedia on Feb. 1, 2007.
Heidemann et al., publication entitled "Unsupervised image categorization," published in Image and Vision Computer, Guildford, GB, Sep. 20, 2005.
Lowe, David G., Distinctive Image Features from Sale-Invariant Keypoints, IJCB, 60 (2004) 91-110.
Sivic, J. and Zisserman, A., Video Google: "A Text Retrieval Approach to Object Matching in Videos," in ICCV (2003).
Philbin, J., Schum, O., Isard, M., Sivic, J., and Zisserman, A. Object Retrieval with large vocabularies and fast spatial Matching, CPVR (2007).

* cited by examiner

ASSISTANCE DEVICE FOR IMAGE RECOGNITION

CROSS REFERENCE TO RELATED APPLICATIONS

This application is a National Phase of International Application No. PCT/FR2009/000702, filed on Jun. 12, 2009 which claims priority to French Application No. 0803345 filed on Jun. 16, 2008, which applications are hereby incorporated by reference in their entirety.

TECHNICAL FIELD

The present disclosure relates to an assistance device for image recognition.

BACKGROUND

One function of image recognition devices is generally to search for similar images in a database, either two-by-two, for example, for suppressing duplicates in this base, either from a request for an image, for example for searching images illustrating the same subject as the request-image.

"By similar images", in the context of this application means images illustrating the same object or the same scene, under potentially different snapshot conditions. This definition notably covers images which are modified in a synthetic way, for example by a compression operation or a mischievous filtering attack.

Multiple applications may be contemplated, such as for example the identification of stolen objects on on-line auction sites, the sorting of batches of photographs, and the identification of counterfeits of models or images.

Another function of these devices is to evaluate the likeness of two similar images, in particular, in order to arrange the resulting images in order according to their relevance.

There are multiple technologies in existence for use in image recognition. Most of these technologies, at least the most recent ones, are based on the use of local descriptors, characterizing more particularly interesting areas of an image.

More extensive information on the detection of these areas of interest and on the generation of descriptors relating to them may be found in the following article: Lowe D, Distinctive image features from scale-invariant keypoints, IJCB, 60 (2004) 91-110 ("the Lowe article"), the contents of which are hereby incorporated by reference in its entirety. The comparison and/or the search for images then amounts to comparing local descriptors with each other, which is finer than direct comparison of computer files with each other or than a comparison of images on the basis of global descriptors.

With time, the databases store in memory increasingly large amounts of images. Their use has also widely developed, in particular, through Internet.

In other words, the search for similar images involves constantly more numerous comparison operations. And in practice, this number is so large that it makes the application impossible for devices based on direct comparisons of descriptors with each other.

Another article, (the contents of which are incorporated herein by reference in its entirety), Sivic, J. and Zisserman, A., *Video Google A Text Retrieval Approach to Object Matching in Videos* ("the Sivic article"), in ICCV (2003), proposes that a match be made between the descriptors and an index. An integer value selected from a finite set of integer values is associated with each descriptor. Comparing images with each other then amounts to comparing set of integer values with each other, which requires few computational resources and accordingly accelerates the search.

However, the devices based on this latter technique, a so-called "bag-of-features" technique, do not give entire satisfaction. The number of images estimated to be similar is often too large, with very different images being considered by the device as similar, and/or it is not possible to distinguish the most relevant images.

Further, if the number of values of the index is increased, the opposite effect is obtained, i.e. the devices no longer return any image in practice.

In order to overcome this difficulty, another article entitled: *Object retrieval with large vocabularies and fast spatial Matching*, J. Philbin, O. Schum, M. Isard, J. Sivic and A. Zisserman, CPVR'2007 (the contents of which are incorporated by reference in its entirety), proposes to complete the technique of the "bag of features", by re-evaluating the results obtained by means of this latter technique by integrating space information on the position of the points.

For example, the method disclosed in the Lowe article performs a so-called "Hough" transformation in order to determine every time the parameters of an affine transformation transforming the request-image into one of the resulting images. A score is assigned to each of the images, depending on the number of descriptors which verify the respective affine transformation. Calculating a Hough transform requires resources such that this transform cannot be applied for significant batches of images.

However, because of its very high computing cost, the reclassifying phase only applies to a limited number of images. For very large bases of images, similar images are thereby missed since the bag-of-features technique has not classified them sufficiently well.

SUMMARY

The Applicant proposes a device which will improve the performance of image recognition devices. An exemplary device may comprise:

a memory configured for storing a plurality of sets of descriptors, each set corresponding to an image, wherein each descriptor is associated with a designated area of the image, and comprises first data of the vector type, second data of the angle type), and third data of the scalar type), a first operator, configured for receiving a designation of two descriptors and for establishing a Boolean variable reflecting the verification of a similarity criterion of the vectors of descriptors, from a comparison between the first data of these descriptors, a second operator, configured for receiving a designation of two descriptors and establishing a rotation angle parameter from respective second data of both descriptors, a third operator, configured for receiving a designation of two descriptors and establishing a scale factor parameter from third data of these descriptors, a controller, configured for receiving the designations of a first and of a second of the descriptors and laid out so as to apply the first operator to each pair formed by a descriptor of the first set, and by a descriptor of the second set so as to infer therefrom a list of pairs of similar descriptors, calling the second operator and the third operator for each of the pairs of descriptors of said list and storing in memory the whole of the obtained parameters, and an estimator of the likeness between the images respectively corresponding to the first and to the second set of descriptors, from statistical processing on said set of parameters.

By means of this configuration, the device according to the disclosure allows for finer comparison and therefore a more relevant comparison of images with each other, or of an image with a plurality of images, while retaining processing times close to or even shorter than those of the devices of the state of the art.

BRIEF DESCRIPTION OF THE DRAWINGS

Other features and advantages of the disclosure will become apparent upon examining the detailed description hereafter and the appended drawings wherein.

DETAILED DESCRIPTION

The appended drawings may not only be used for completing the disclosure, but also for contributing to its definition if need be.

Figure 1:
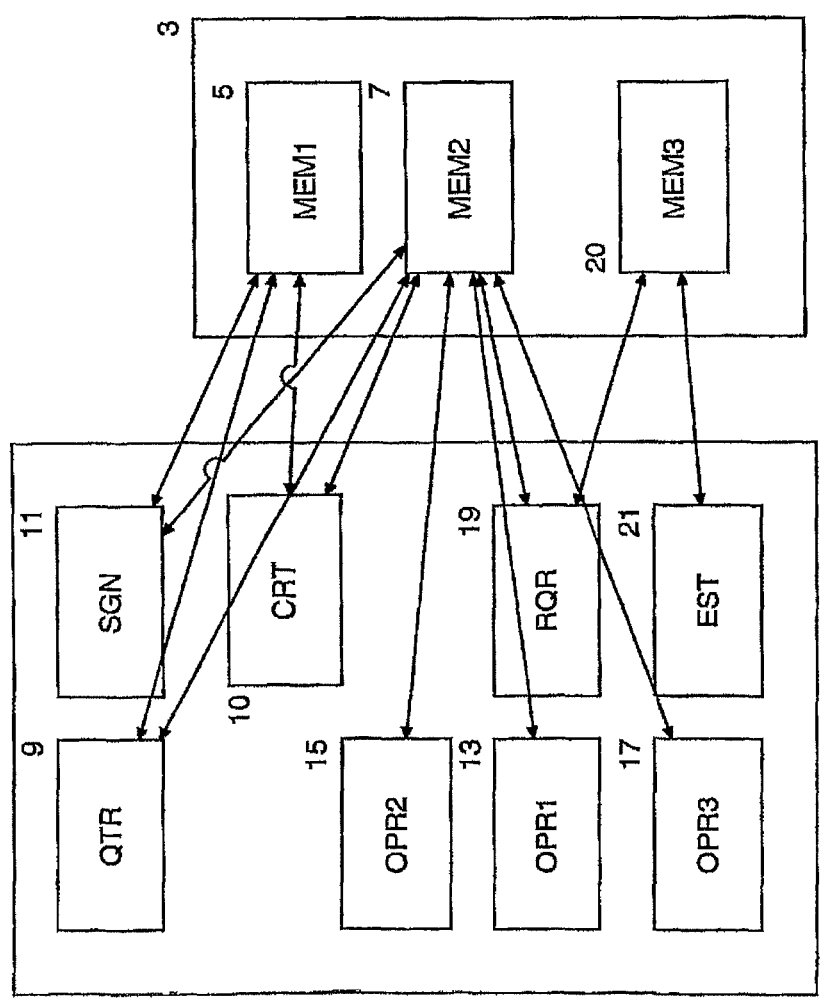
FIG. 1 schematically illustrates an assistance device for the recognition of images according to an exemplary embodiment of the disclosure.

FIG. 1 illustrates an assistance device for the recognition of images according to an exemplary configuration of the disclosure. The device 1 comprises a memory 3 and a processing device 5, capable of interacting with this memory 3.

The memory 3 comprises a first storage structure 5 for storing in memory, at least temporarily, one or more sets of image descriptors. The first storage structure 5 further stores in memory a matching relationship between each of the sets of descriptors and an identifier of the described image.

In the first storage structure, each of the descriptors dij correspond to an image j groups:

first data of the vector type, illustrating a characteristic vector xij of an area of interest i of the image j, second data of the scalar type, representing a characteristic angle aij of said area of interest i of the image j, third data of the scalar type, representing a characteristic scale sij of said area of interest i of the image j, fourth data representing a position cij of a center of this area of interest i of the image j. These fourth data may also be considered as an addition to the first data of the vector type, in other words as first additional data.

Each of the vectors xij has a selected dimension d, for example, 128.

With various tools, it is possible to generate a set of descriptors dij from image j data. Functionally, these tools apply a phase for detecting areas of interest i in an image j, and then a phase for assigning a local descriptor dij to this area. For example, the Lowe article discloses a method for detecting areas of interest and for assigning local descriptors.

The device 1 may be laid out so as to receive the sets of descriptors dij of a generation tool. Alternatively, the device 1 may integrate a tool of this type. The device 1 is then laid out so as to receive data of images. Optionally, the device 1 may comprise an additional storage structure in order to store in memory on a long term basis these image data, for example as a database.

The memory 3 further comprises a second storage structure 7, storing in memory a representation of one or more sets of image descriptors in a particular form, different from the first storage structure 5.

For each of the descriptors dij, the second storage structure 7 stores in memory a relationship between this descriptor dij and an integer value q(xij) selected from a set of integer values common to the set of descriptors dij, called an index. This integer value q(xij) is sometimes designated as a "visual word". This integer value q(xij) is established according to the characteristic vector data (xij).

The possible index number depends on the contemplated application for the device 1. The index number may generally be comprised between 1,000 and 1,000,000.

Advantageously, the second storage structure 7 stores in memory for each of the descriptors dij a matching relationship between an identifier of this descriptor dij and its integer value q(xij). This allows a reduction in the size of the second storage structure 7.

Alternatively, the second storage structure 7 stores in memory every time a matching relationship between an identifier of the image j corresponding to the descriptor dij and the relevant integer value q(xij). Preferably, the image j identifier is stored in memory as a replacement for the identifier of the descriptor dij in order to still further reduce the size of the second storage structure 7.

In a particularly advantageous way, the second storage structure 7 assumes the form of a structure of inverted lists.

More specifically, the second storage structure 7 then appears as a set of lists. With each of the integer values of the index is associated a list, which list includes an identifier of each of descriptors dij with which this integer value is associated. This storage structure allows storage in memory of a representation of the whole of the sets of descriptors by means of integer values, in a very compact way. This embodiment of the second storage structure 5 also accelerates the querying operations.

Alternatively, each of the lists of the second storage structure 7 may include, as a replacement for or as an addition to the identifier of a descriptor dij itself, an identifier idj of the image to which corresponds this descriptor dij in the first storage structure 5. The replacement of a descriptor identifier dij with an image identifier idj further reduces the size of the second storage structure 7.

In the case when a same integer value q is associated with several descriptors dij of a same image j, the list corresponding to this integer value q may include either an occurrence number relating to the identifier of the image idj, or several entries, each entry in the list corresponding to an occurrence.

This second alternative may be preferential, since it only very slightly increases the size of the second storage structure 7, given that it is not very likely that a same integer value q be assigned to different descriptors dij of a same image j.

The processing device 5 comprises a quantifier 9 capable of associating an integer value q(xij) with each of the descriptors dij stored in memory in the first storage structure 5 according to the corresponding characteristic vector xij data.

The quantifier 9 is laid out so as to apply an average over the k-closest neighbours, or "k-means clustering", on a set of control image data. The result of this is a set of Voronoi centroids and cells. The identifier of the closest centroid of the characteristic vector xij of the processed descriptor dij is assigned as an integer value q(xij). The proximity of a characteristic vector xij to a centroid may be calculated by means of an Euclidian distance.

The quantifier 9 is optional. The device 1 may be laid out so as to receive the whole of the integer values q(xij) which are associated with the descriptors dij of the first storage structure 5, possibly as a replacement of the sets of actual descriptors dij.

The processing device 5 further comprises a signature device 11, laid out so as to receive a descriptor dij, and for establishing vector type data representing a multi-dimensional binary signature bi(xij) of this descriptor dij, from characteristic vector xij data. The binary signature vector bi(xij) has a selected dimension db, for example 64.

Each of the components of the binary signature vector bi(xij) may exclusively assume the value "0" or the value "1". In other words, the binary signature vector bi(xij) consists of Boolean variables.

The second memory structure 7 is laid out in order to store in memory a matching relationship between the binary signature data bi(xij) of each of the descriptors dij stored in memory in the first storage structure 5 and an identifier of this descriptor dij, or of the image j corresponding to this descriptor dij.

When the second storage structure 7 is made in the form of inverted lists, each of the binary signatures bi(xij) may be stored at the entry relating to the corresponding descriptor dij in the list. In other words, in this embodiment of the second storage structure 7, each of the binary signatures bi(xij) is stored in memory in a matching relationship with the integer value q(xi) assigned to the descriptor (dij), and not with the data making up this descriptor dij (vector, angle, scale characteristics). For example, each of the entries of the inverted list structure may have a set number of bits, for example 64, for storing a binary signature. This embodiment allows a particularly compact storage of binary signatures, in a matching relationship with an image identifier idj, or descriptor dij.

Figure 2:
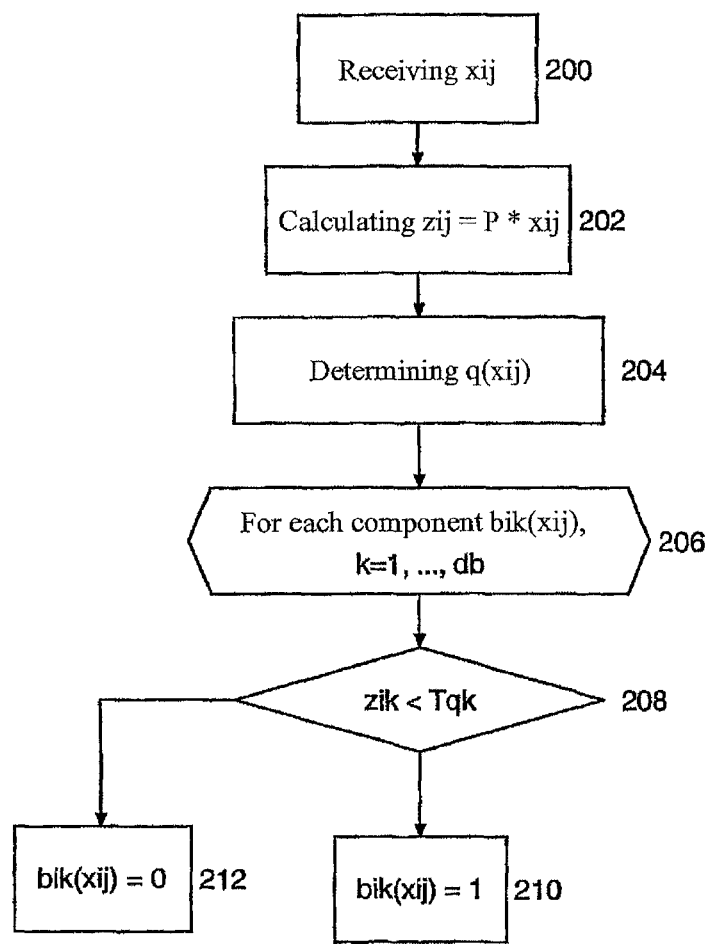
FIG. 2 is a flow chart illustrating an embodiment of a signature device for the device of FIG. 1.

FIG. 2 illustrates a layout of the signature device 11. In a step 200, the signature device 11 receives characteristic vector data xij relating to a descriptor dij stored in memory in the first storage structure 5.

In a step 202, data of the vector type, representative of a projection of the characteristic vector xij, are calculated by means of a projection matrix P of dimensions db×d.

The same projection matrix P is used for the whole of the descriptors dij stored in memory in the first storage structure 5 and for which it is desired to obtain a representation in the second storage structure 7.

Representative data of a projected vector zij of dimension db, are obtained. The components of the projected vector zi are noted as zi1, zi2, . . . , zidb.

In a step 204, an integer value q(xij) is associated with the characteristic vector xij. The quantifier 9 may be called in order to establish the integer value q(xi). The integer value q(xi) may also be read in the second storage structure 7, in the case when a representation of the corresponding descriptor dij already exists in this second storage structure 7.

When this second storage structure 7 is made in the form of inverted lists, the matching relationship between the integer value q(xij) and the characteristic vector xij may already be stored, as a list identifier, for example an index number, and as an entry in this list including an identifier of the descriptor dij. If said matching relationship is absent from the second storage structure 7, then it may be stored in memory consecutively to step 204.

In a step 206, a computational loop is started on the component bik of the signature vector bi(xij). The index k varies from 1 to db.

In a step 208, the k-th component zik of the projected vector zi is compared with a median value Tq(xij)k, specific to the integer value q(xij) of the characteristic vector xij and to the component k.

If the k-th component zik of the projected vector zi is greater than the median value Tq(xij)k, then the k-th component bik(xij) of the binary signature vector bi(xij) assumes the value "1" (one) in step 210. Otherwise, this k-th component bik(xij) assumes the value "0" (zero) during step 212.

Figure 3:
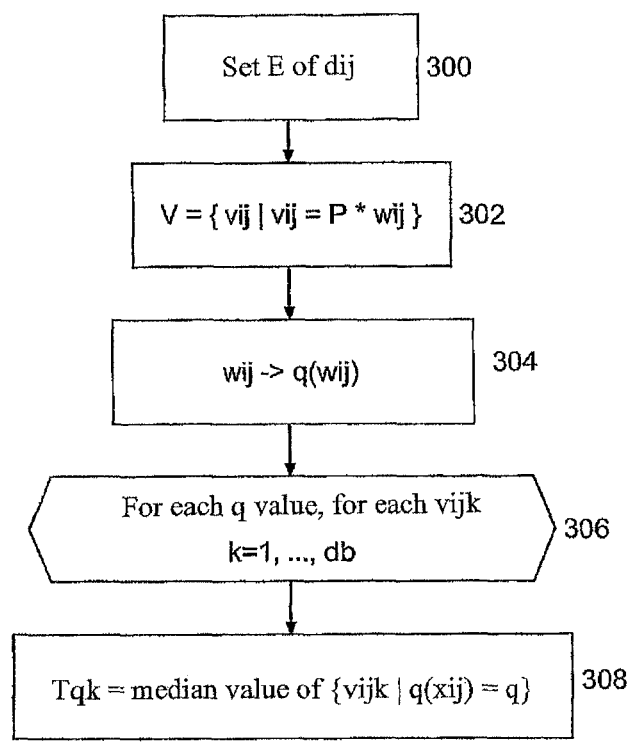
FIG. 3 is a flow chart illustrating a portion of the signature device of FIG. 2.

FIG. 3 illustrates the determination of the median values Tq(xij) by the device of signature 11. In a step 300, the signature device 11 receives a set E of descriptors eij relating to image data distinct from image data illustrated in the second memory structure 7. Each of the descriptors eij comprises representative data of a characteristic vector wij, of dimension db.

In a step 302, each of the characteristic vectors wij of the descriptors eij of the set E is projected by means of the projection matrix P. A set V of projected vectors vij is obtained. The components of a projected vector vij are noted as vij1, vij2, . . . , vijdb.

In a step 304, an integer value of the index is assigned to each of the characteristic vectors wij, for example by means of the quantifier 9. The memory 3 at least temporarily stores a matching relationship between each integer value q of the index and the whole of the components of each of the projected vectors vij, the characteristic vector wij of which has been assigned this integer value q. A structure of inverted lists may be used.

In step 306, a loop over the integer values q of the index and over the components vijk of the projected vectors vij is started. The index k varies from 1 to db.

In a step 308, the median value Tqk, relating to the integer value q and to the component k, is calculated as a median value of the k-th components vijk of the projected vectors vij associated with the relevant integer value q.

The projection matrix P is obtained from a matrix of randomly generated Gaussian values A. The matrix A has db columns.

Factorisation or decomposition of the QR type is carried out on the matrix of Gaussian values A, wherein Q is an orthogonal matrix and R is a triangular matrix. The first d lines of the matrix Q which has db columns, form the projection matrix P.

The processing device further comprises a characterization device 10 capable of interacting with the first storage structure 5 and the second storage structure 7. The characterization device is laid out so as to establish, for each of the descriptors dij stored in memory in the first storage structure 5, quantified characteristic angle data qaij, from characteristic angle data aij, and logarithmic quantified scale factor data qsij, from characteristic scale data sij. The quantification of data of a characteristic angle comprises the assignment of an indexed value associated with an interval of angular values in which is located the characteristic angle. Also, the quantification of data with a characteristic scale comprises the assignment of an indexed value associated with an interval of scale factor values in which is located the decimal logarithm of the characteristic scale.

The quantified angle qaij and quantified scale factor qsij values of each of the descriptors dij stored in memory in the first storage structure 5 are stored in memory in the second storage structure 7, in a matching relationship with an identifier of the relevant descriptor dij, or of the image j for which this descriptor dij was generated.

When this second storage structure 7 is made in the form of inverted lists, these quantified angle qaij and quantified scale factor qsij values are advantageously stored at the entry representing a relevant descriptor dij. In other words, in the particular list designated by the integer value q(xij), the identifier of the descriptor dij or of the image j is added with said quantified values. Each entry of a list may comprise a certain number of bits reserved for storing these quantified values, for example 6 bits for storing the quantified angle value qaij and 5 bits for storing the quantified scale factor value qsij. It is understood that the number of reserved bits determines the extent of the quantification intervals.

The processing device 5 further comprises a first operator 13 capable of interacting with the second memory structure 7. The first operator 13 is laid out in order to establish a similarity value f(xij,zkl) between the characteristic vectors xij and ykl of two descriptors, for which a representation is stored in memory in the second memory structure 7.

The determination of this similarity value f(xij,ykl) essentially consists of checking here whether the integer values q(xij) and q(ykl) of the characteristic vectors xij and ykl meet a pre-established similarity condition.

Figure 4:
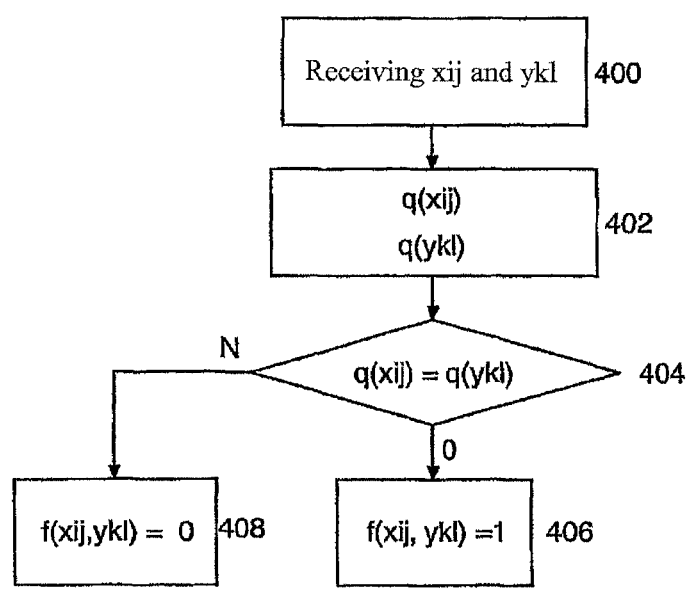
FIG. 4 is a flow chart illustrating a first embodiment of a first operator for the device of FIG. 1.

FIG. 4 illustrates a first embodiment of the first operator 13. In a step 400, the first operator 13 receives a first characteristic vector xij and a second characteristic vector ykl, or only identifiers of these characteristic vectors.

In a step 402, the first operator 13 establishes the integer value q(xij) of the index for the first characteristic vector and the integer value q(ykl) for the second characteristic vector. Advantageously, at least one of these integer values q(xij) and q(ykl) is obtained from the second storage structure 7. The recovery of these integer values q(xij) and q(ykl) is then particularly fast.

In a step 404, the first operator 13 compares the integer values q(xij) and q(ykl) obtained in step 402. If these integer values q(xij) and q(ykl) are equal, then the first operator returns a Boolean variable of value "1" as a similarity value f(xij,ykl), in step 406. This indicates the similarity of the characteristic vectors in the sense of this first criterion. Otherwise, the returned similarity value f(xij,ykl) assumes the value "0", in step 408.

When the second storage structure 7 is made in the form of inverted lists, and when one of the integer values q(xij) and q(ykl) is known to the first operator 13, the comparison with the other one of these integer values amounts to browsing the list identified by the known integer value, in order to check whether this list contains the identifier of the descriptor corresponding to the characteristic vector of the other integer value. An integer value q(xij) assigned to the characteristic vector xij of the descriptor dij is in particular known when it has been received in step 400, or further when it has been recovered beforehand in the second storage structure 7.

By storing in memory a representation of the characteristic vectors of the descriptors as integer values in the second storage structure 7, it is possible to compare characteristic vectors with each other particularly rapidly. This comparison is further faster when a structure of inverted lists is applied for the second storage structure 7.

Figure 5:
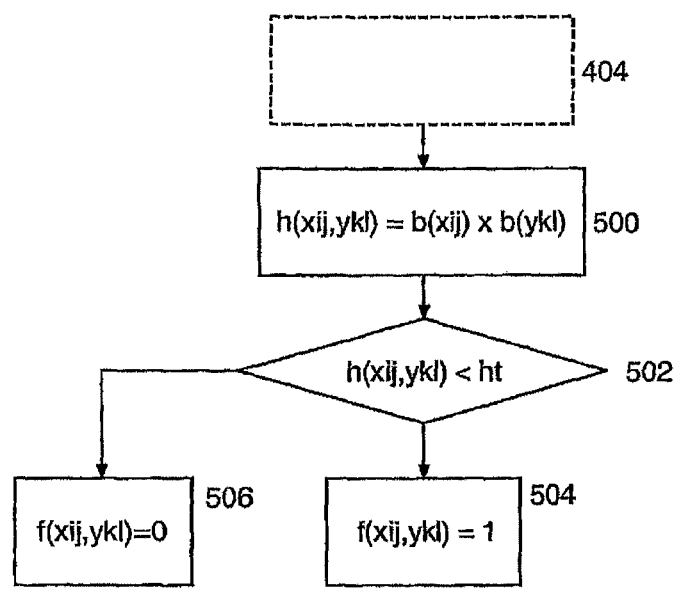
FIG. 5 is analogous to FIG. 4, for an alternative embodiment.

In an alternative embodiment illustrated by FIG. 5, the step 404 is continued with the following steps, as a replacement of step 406.

In a step 500, the first operator 13 calculates a scalar product h(bij(xij),bkl(ykl)) of the binary signatures bij(xij) and bkl(ykl) from the first characteristic vector xij and from the second characteristic vector ykl respectively. The values of these binary signatures bij(xij) and bjk(xkl) are recovered in the second storage structure 7, from integer values q(xij) and q(ykl) corresponding to the first characteristic vector xij and to the second characteristic vector ykl, respectively.

In a step 502, the obtained scalar product h(bij(xij), bkl (ykl)) is compared with a predetermined threshold value ht. If this scalar product h(bij)(xij),bkl(ykl)) is less than the threshold value ht, then the first operator returns a Boolean variable with the value of "1" (one) as a similarity value f(xij,ykl), in step 504. Otherwise, the first operator 13 returns a Boolean variable of value "0" (zero) as a similarity value f(xij,ykl), in step 506.

In an advantageous development, the first operator returns in step 506 a weighted value as a similarity value f(xij, ykl) as a replacement for a Boolean variable of value "1".

As described in the Sivic article for example, it is possible to use weighting of the "tf-idf" type (for "term frequency-inverse document frequency", i.e.: "frequency of the terms-inverse frequency of the documents"). This weighting is frequently used in the field of searching for textual documents.

The processing device 5 further comprises a second operator 15 capable of interacting with the second memory structure 7 in order to establish a rotation angle parameter DeltaΔ for two descriptors dij and dkl of the first memory structure 5. The second operator is laid out so as to establish this rotation angle parameter DeltaA from data of quantified characteristic angle values, qaij and qakl, stored in memory in the second storage structure 7. When a structure of inverted lists is used for this second storage structure 7, these quantified characteristic angle values qaij and qakl may be read from integer values q(xij) and q(ykl) assigned by the descriptors dij and dkl.

Figure 6:
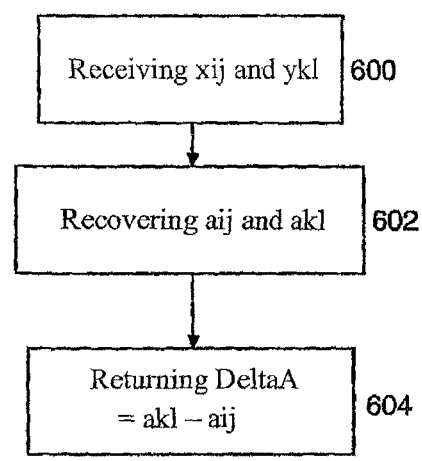
FIG. 6 is a flow chart illustrating an embodiment of a second operator for the device of FIG. 1.

FIG. 6 illustrates an embodiment of this second operator 15. In a step 600, the second operator 15 receives a first characteristic vector xij and a second characteristic vector ykl, or preferably only identifiers of these characteristic vectors.

In a step 602, the second operator 15 recovers the quantified characteristic angle data qaij and qakl for each of the descriptors dij and dkl. When the first characteristic vector xij and the second characteristic vector ykl are received in the preceding step, it may be necessary to establish beforehand their integer values q(xij) and q(ykl) for querying the second storage structure 7, in particular when the latter is made in the form of inverted lists.

When such a structure of inverted lists is used, by knowing one of these integer values, for example q(xij) it is possible to search very rapidly, consisting of browsing the list identified by this integer value q(xij) in order to find the identifier of the descriptor dkl therein, to which is added the quantified angle value qakl.

In a step 604, the second operator 15 returns a difference between the quantified characteristic angle values qaij and qakl as a rotation parameter DeltaA. Preferably, the rotation parameter DeltaA is returned in a quantified form.

The processing device 5 still further comprises a third operator 17 capable of interacting with the second memory structure 7 in order to establish a scale factor parameter DeltaS for two descriptors dij and dkl stored in memory in the first storage structure 5 from data of quantified scale factors stored in memory in the second memory structure 7.

Figure 7:
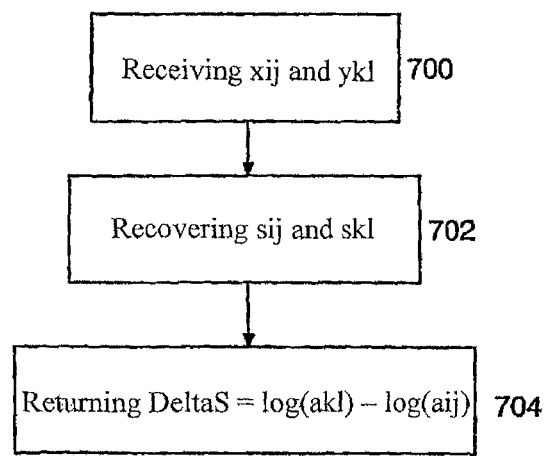
FIG. 7 is a flow chart illustrating an embodiment of a third operator for the device of FIG. 1.

FIG. 7 illustrates an embodiment of this third operator 17, analogous to the embodiment of the second operator 15. In a step 700, the third operator 17 receives a first characteristic vector yij and a second characteristic vector ykl, or preferably only identifiers of the descriptors dij and dkl to which these characteristic vectors correspond. One of the integer values q(xij) and q(ykl) assigned to these characteristic vectors may also be received.

In a step 702, the third operator recovers the quantified characteristic scale factor data qsij and qskl of each of the two descriptors dij and dkl.

In a step 704, the third operator returns the logarithmic difference of the characteristic scale factors as a scale parameter DeltaS. Preferably, the scale parameter DeltaS is returned in a quantified form.

The processing device further comprises an interrogator 19, capable of receiving a first set of descriptors di1, relating to a first image, or preferably only an identifier id1 of this first image, and a second set of descriptors dig, relating to a second image or, preferably only an identifier id2, of this second image.

Figure 8:
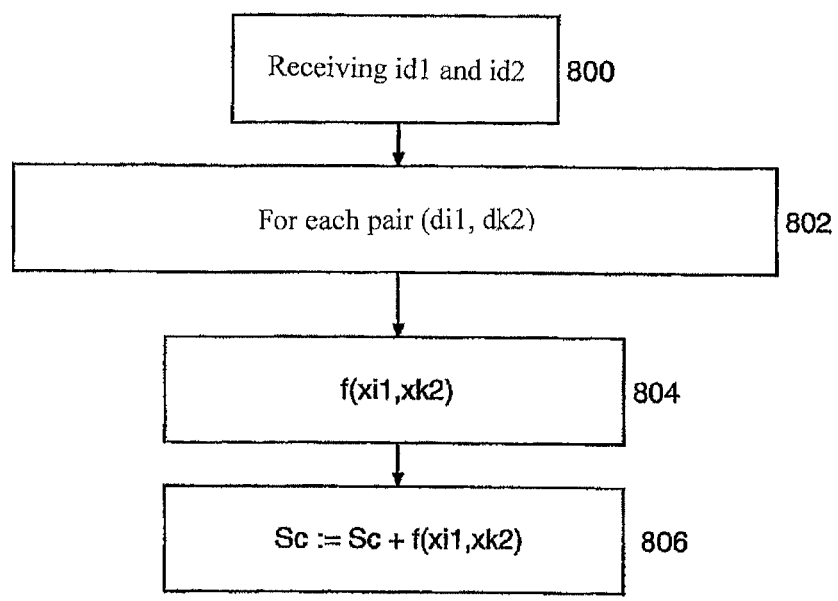
FIG. 8 is a flow chart illustrating an embodiment of an interrogator for the device of FIG. 1.

FIG. 8 illustrates an embodiment of the interrogator 19. In step 800, the interrogator 19 receives the identifier id1 of a first image and the identifier id2 of a second image.

For each pair formed with a descriptor di1 of the first image and with a descriptor dj2 of the second image, the interrogator 19 iteratively calls the first operator 13, during a step 802. This is achieved for the whole of the first and second sets of descriptors. The operator 13 is called every time with the identifiers of the descriptors di1 and dj2.

The first operator 13 sends back a similarity value f(xi1, yk2), in step 804. As the second storage structure 7 optimises the computer search operations between descriptors, by means of the indexed representation, steps 802 and 804 are carried out particularly rapidly.

The interrogator 19 is laid out so as to interact with a third storage structure 20 in order to store in memory therein, a matching relationship between a score variable Sc, and an identifier of at least one of the first and second images. The score variable Sc adds the similarity values f(xi1,yk2) returned as results of the successive calls of the first operator 13 during a step 806.

At the end of step 806, the value of the resulting score variable Sc gives a measurement of likeness or similarity between the first image and the second image. The value of the score variable Sc may also be considered as a measurement of relevance, or of proximity of the second image with respect to the first image. This first image may be considered as a request-image.

The final value of the score variable Sc may be treated by a statistical function, for example in order to weight this value.

When the second storage structure 7 is made in the form of inverted lists, this comparison of the first and second images with each other is further accelerated. When the integer values q(xi1) assigned to the descriptors of the first image, for example, are known, steps 802, 804 and 806 comprise browsing through each of the lists identified by these integer values q(xi1) every time searching for an identifier of a descriptor of the second image. When such an identifier is located, the score variable Sc is increased by the value f(xi1,yk2). For example, the score variable Sc is every time increased by the value 1 ("one"). In the case when an image identifier idj is stored in memory as a replacement for a descriptor identifier dij, it is the identifier of the second image which is sought, which further accelerates the comparison.

The interrogator 19 may repeatedly be called for the first image, or the first descriptor set di1, with every time a second image, or a second set of descriptors dij, represented in the second storage structure 7, so as to compare the first image to the whole of the images represented in the second storage structure 7.

A score variable Scj may thus be obtained for each of the images j of the base, representing a measurement of proximity of the image j with respect to the first image, or request-image. In other words, the third storage structure 20 may contain a table of scores Sc1[ ], relating to the first image, grouping the whole of the score variables Scj each time in a matching relationship with an identifier idj of the image j.

A classification of the images j as to their likeness or similarity to the first image is thereby obtained.

When the second storage structure 7 is made in the form of inverted lists, the comparison of the first image to the whole of the images illustrated in this second structure 7 is particularly fast. The interrogator 19 is laid out in order to, from each of the integer values assigned to the descriptors of the first image, browse the list identified by this integer value in the second memory structure 7 to increase the score Scj of each of the images to which corresponds an entry of this list. It is understood that it is then particularly of interest to store in memory in this entry the image identifier idj as a replacement for a descriptor identifier in order to further increase the rapidity of the comparison.

When binary signatures bi are stored in memory in the second storage structure 7, the score Scj of an image j is even more relevant, since the comparison of the binary signatures refines the comparison of two images with each other. The Applicant noticed that the images returned by the interrogator 19, in this embodiment, are more relevant than the images identified by the devices of the state of the art.

In these devices, a selection of an index cardinal k should be made. A low k index cardinal value has the consequence of wide Voronoi cells. This has the advantage that noisy versions of the descriptors have a large probability of being found in the same cell (same integer value) and the drawback that the descriptors loose their discriminating power, since very different descriptors may be found in the same cell. A low k index cardinal value has the consequence of reduced Voronoi cells. This has the advantage of retaining good accuracy of the descriptors, but has the drawback of a strong probability that a noisy version of a descriptor be found in a cell distinct from that of the relevant descriptor, as well as large memory consumption.

By utilization of the binary signatures, the device according to the disclosure has an exemplary advantage of a high k index cardinal value and low k index cardinal values.

Figure 9:
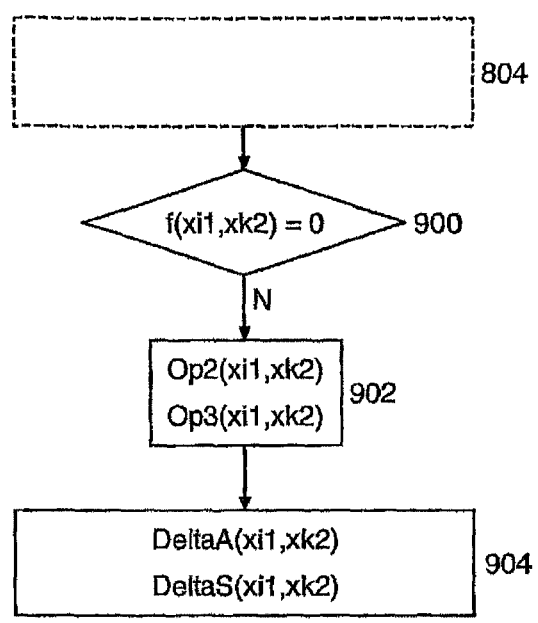
FIG. 9 is analogous to FIG. 8 for a second embodiment.

In a second embodiment, illustrated by FIG. 9, the interrogator 19 is laid out so as to perform the following operations, when the similarity value returned in step 804 is non-zero (step 900).

The interrogator 19 calls the second operator 13 and the third operator 15 for the descriptors di1 and dk2 during comparison, in step 902. The second operator 13 and the third operator 15 respectively send back a quantified value of a rotation angle parameter DeltaA and a quantified value of a scale factor parameter DeltaS, in step 904.

The interrogator 19 is laid out in order to interact with the third storage structure 20 so as to store in memory a matching relationship between the quantified rotation angle value DeltaA, the quantified value of the scale factor DeltaS and the similarity value f(di1,dk2) on the one hand and an identifier of at least one of the first and second images.

Here, the interrogator 19 is laid out so as to create a score table SC2as[ ] gathering for each pair of quantified rotation angle value DeltaA and of quantified scale factor value DeltaS, a score Sc successively increased by the similarity value f(di1,dk2) returned under these angle and scale conditions. In this table, the angle and scale data are quantified. In other words, the interrogator 19 builds the score table SC2as[ ] for the second image, a table of selective dimensions, indicating angle classes, for example in columns, and scale factor classes, for example in ordinates: the similarity value is written in a matching relationship with the angle and scale factor classes, if necessary added with a prior similarity value.

The thereby built score table Scas[ ] may be processed by an estimator 21 capable of interacting with the third storage structure 20 in order to carry out statistical processing operations. For example, the estimator 21 may be laid out so as to establish as a final score value Sc2 for the image 2, the maximum value of the scores of the whole of the score table Scas[ ]. In practice, the estimator 20 may be laid out so as to smooth out the obtained results by gathering the results of adjacent cells into a same cell, in order to avoid effects of edges or quantification noise.

Alternatively, the estimator may be laid out in order to weight the results for certain values of angles and/or of scale. This weighting is selected depending on the application in order to give preference to certain angles of rotation and certain scale ratios, in particular angles of value 0, which may correspond to snapshots in a landscape mode, and 90°, which may correspond to a snapshot in portrait mode, and the scale factor value 0, which may correspond to the absence of a zoom effect.

When the second storage structure 7 is made in the form of inverted lists, the comparison between two images is still faster, in particular by means of the storage of quantified angle and scale values directly in these lists. As the whole of the integer values q(xli) assigned to the descriptors of the first image are known, the comparison comprises browsing through each of the lists identified by one of these integer values in order to search for the identifier id2 of the second image, or a descriptor identifier corresponding to the second image. When such an entry is found, the similarity value is stored in memory in a matching relationship with the quantified angle and scale factor values.

The interrogator 19 may perform the same processing with the whole of the images j, or with sets of descriptors dij, one representation of which is stored in memory in the second storage structure 7. The result of this is a score table Scas[ ] storing in memory a matching relationship between an identifier idj of image j and its particular score table Scjas[ ]. This score table Scjas[ ] may be processed by the estimator 21 so that a single so-called final score value, Scj is associated with each of the image j identifiers. Classification of the images j as to their similarity with image 1 may thereby be obtained.

The applicant has noticed that the result images returned by the interrogator 19 in this embodiment are still more relevant, in particular because characteristics of a geometrical nature are taken into account in the comparisons. Because the comparison of these geometrical characteristics is limited to establishing an angle of rotation and a scale factor exclusively, the whole of the search process remains very fast in practice. As this comparison is obtained by a simple arithmetic operation on quantified values stored in memory in the second storage structure, it does not require many computing resources and is fast. In particular, the determination of the rotation angle DeltaA and scale factor DeltaS parameters does not involve characteristic vector data in order to avoid too many calculations which are detrimental to the performance of the device 1.

In the case when a structure of inverted lists is used, the comparison of images is still faster. In particular, a table of scores may be made for each of the entries of the structure of inverted lists, and then the scored tables of the descriptors of a same image gathered in a same table. This is still faster and more performing when each entry of the inverted lists contains an image identifier. In this case, each image only receives a single score for the first embodiment of the interrogator.

In an alternative of this second embodiment, the interrogator 19 is laid out so as to maintain for each image j a table of angle scores Sa and a table of scale factor scores Ss, respectively grouping similarity values, optionally added together depending on the quantified rotation parameter DeltaA and scale factor DeltaS values, angle classes and scores depending on the scale factor classes.

In this case, the third storage structure 20 is simplified, and the classification process accelerated.

The estimator 21 may be laid out in order to assign to an image j the smallest value of the largest values of scores of each of the angle score tables Sca[ ] and scale score tables Scs[ ] as a final score value Scj.

When a structure of inverted lists is used, each of these vectors may be stored in connection with the corresponding entry.

As this was seen, the second storage structure 7 is particularly compact when it is made in the form of inverted lists.

Figure 10:
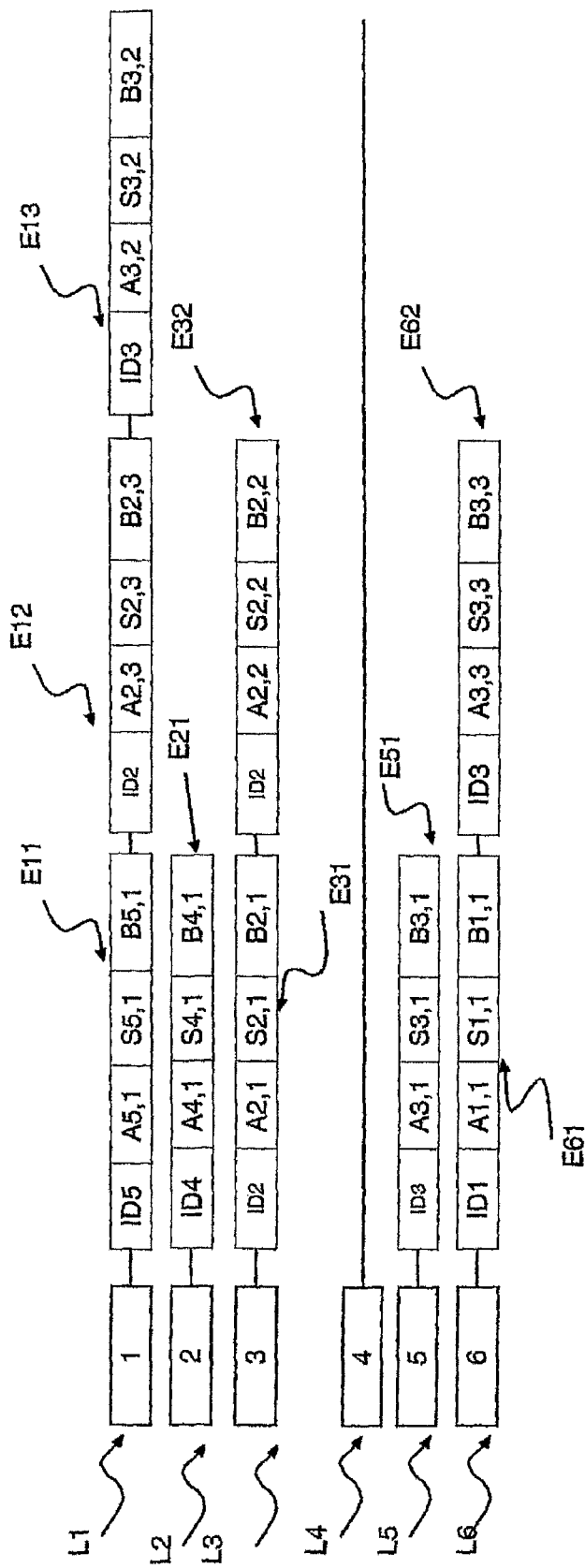
FIG. 10 is a diagram illustrating a structure of inverted lists for a second storage structure for the device of FIG. 1.

In FIG. 10, an exemplary embodiment of the second storage structure 7 in the form of inverted lists is illustrated. Each of the lists L1, L2, . . . , L6 is identified by an index value, here 1, 2, . . . 6. Each list Li, i=1, . . . , 6, groups a certain number of entries Eij. Each entry includes an image identifier IDk, a quantified characteristic angle value Ak,l, a quantified scale factor value Skl (logarithmic value), and a binary signature value Bkl.

Each entry Eij is such that a characteristic vector xlk of the image k was assigned the index number of the list as an integer value q(xlk). Alternatively, a descriptor identifier may be stored.

For example, the image identified by ID1 is represented in this second storage structure 7 by a single descriptor (a single entry in the structure of inverted lists, referenced as E61), to which the integer value 6 was assigned. In other words, this descriptor is represented by its integer value in the second storage structure 7.

The third image, identified as ID3, is characterized in the first storage structure 5 by three descriptors (3 entries include the identifier ID3 in the second storage structure 7). These descriptors are respectively represented in this structure of inverted lists, by integer values 1, 5 and 6, as shown by the entries E13, E15 and E62.

The advantage of a structure with inverted lists is a particularly compact storage of a representation of a very large number of images. The amount of memory assigned to each of the entries of the lists is reduced as far as possible, while retaining a maximum of information for comparing descriptors with each other. Good results in terms of compactness and relevance of the results were obtained by the Applicant with entries laid out as follows:

21 bits of memory are reserved for the identification of an image (IDk), 6 bits of memory are reserved for storing the quantified characteristic angle value Akl, 5 bits of memory are reserved for storing the logarithm of the characteristic scale Skl, and 64 bits are reserved for storing the binary signature Bkl.

In the first operator 11, the threshold value ht and the dimension db are established in such a way that the ht value is less than or equal to the value of the dimension db. This threshold value ht should be sufficiently high in order to guarantee that the n closest vectors, in the sense of the Euclidian distance, to a characteristic vector xij are determined as being similar, i.e. the scalar product of their binary signature should be less than ht. The threshold value ht should at the same time be low so as to filter the numerous points which are positioned in a remote portion of the corresponding Voronoi cell. The selection of the threshold value ht therefore results from a compromise.

Figure 11:
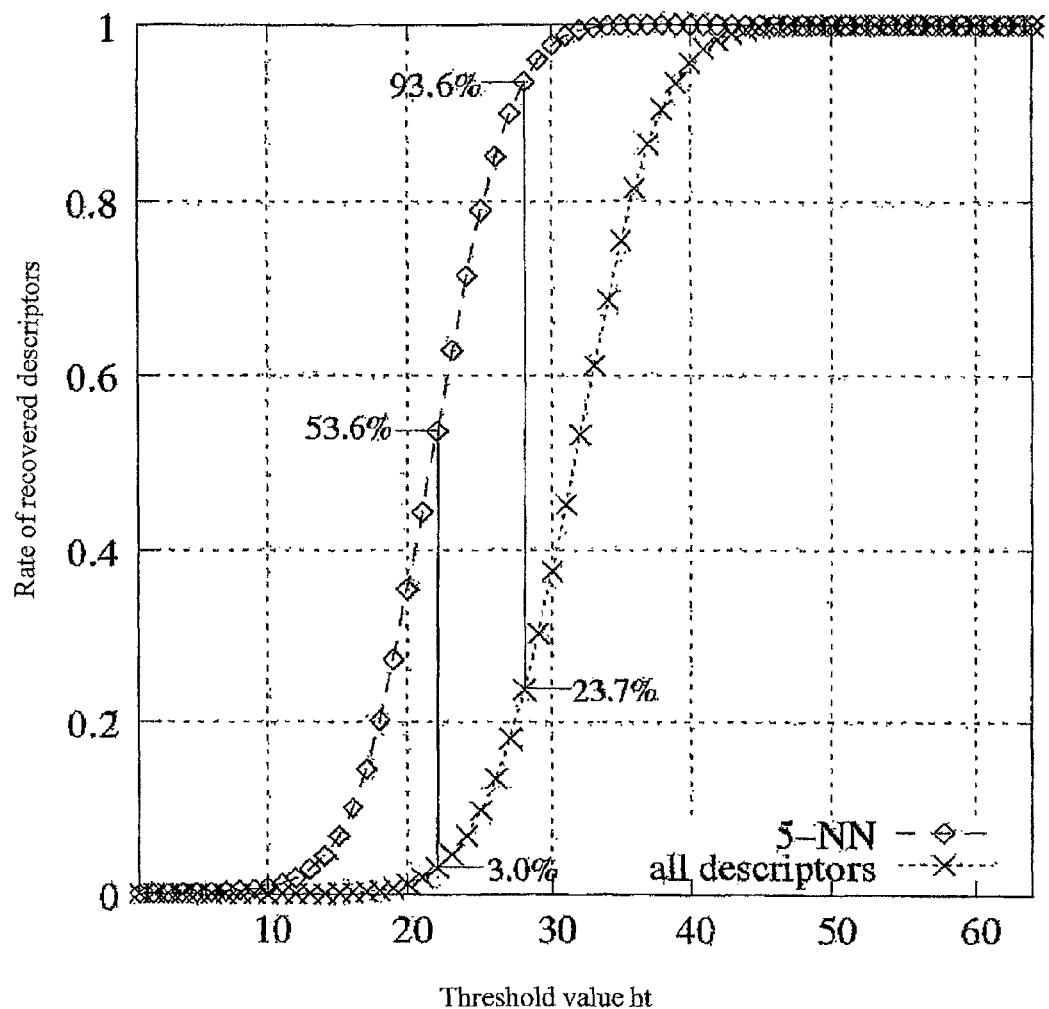
FIG. 11 is a graph illustrating efficiency of the first operator versus the value of a threshold parameter.
Figure 12:
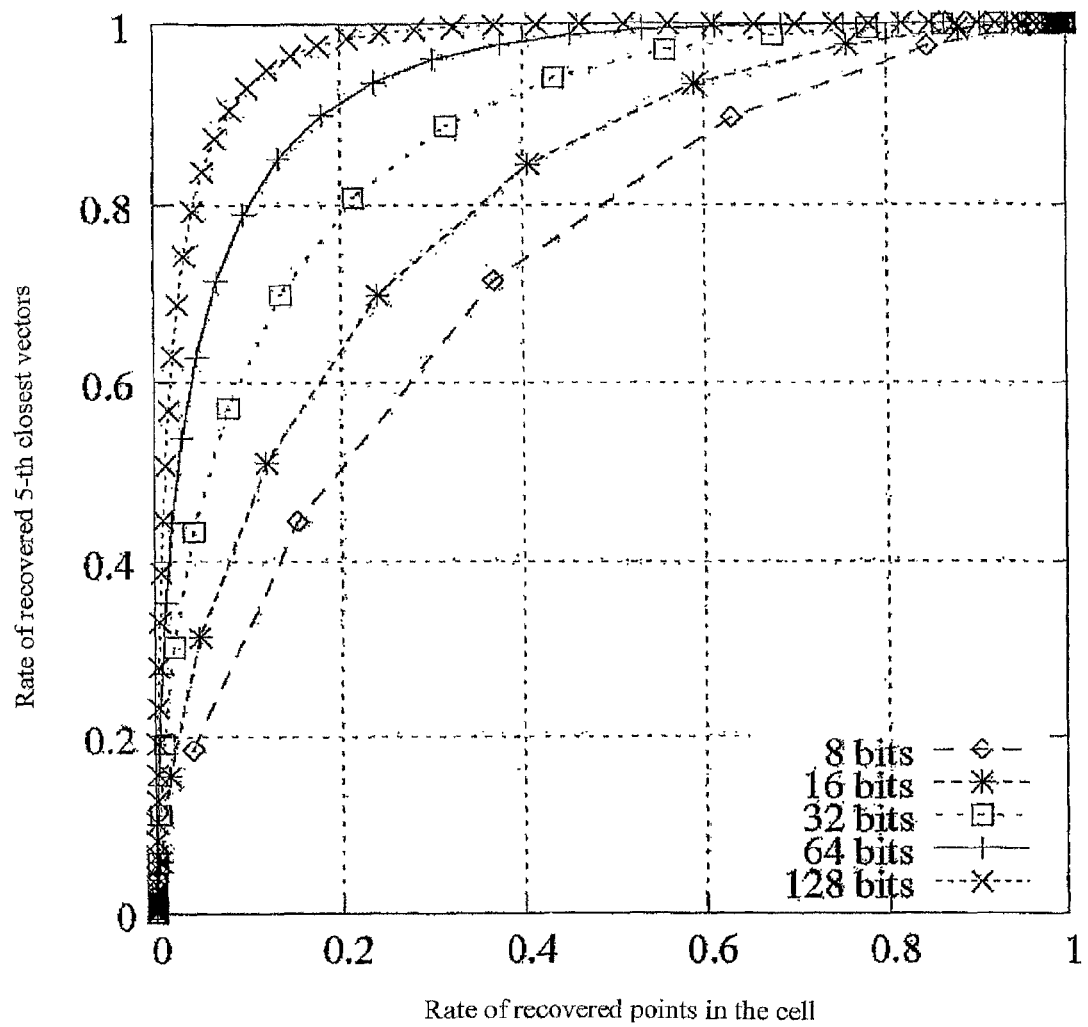
FIG. 12 is a graph illustrating the performance of the first operator versus a dimensional parameter.

The graphic illustrations of FIGS. 11 and 12 respectively show the rate of recovered descriptors versus the threshold value ht, and the rate of 5-th closest recovered vectors versus the rate of points recovered in a cell.

The graph of FIG. 11 was obtained with a dimension value db set to 64. Recovered descriptor rates are respectively meant herein the rate of cell descriptors and the rate of i-th closest vectors, here 5, which are filtered by the first operator 13.

Graphs 11 and 12 were generated by analyzing a set of descriptors assigned to a same centroid. Given a characteristic vector x, the rate of descriptors in filtered by the first operator 13, i.e. the descriptors for which the similarity value f(x,m) with the vector x is zero, is compared with the rate of the 5 closest vectors which are recovered in the cell comprising 1,000 descriptors.

The graph of FIG. 11 shows that the selection of the threshold value ht, here selected between 20 and 30, guarantees that most of the cell descriptors are filtered and that the n closest vectors of these descriptors are preserved with strong probability. A threshold value ht set to 22 has the consequence of filtering about 97% of the descriptors while 53% of the five closest vectors are preserved. A higher threshold value ht, here set to 28, results in keeping 94% of the five closest vectors and in filtering 77% of the cell descriptors.

The graph of FIG. 12 illustrates the difference between the filtering rates of these different descriptors for different values of dimensions db. The best filtering quality is obtained for the largest dimension values db. Large dimension values db require a larger memory storage space. Accordingly, the value of the dimension db also results from a compromise between the accuracy of the first operator 13 and the amount of memory used. A dimension db with the value 64 seems to be a good compromise.

The device according to the disclosure gives the possibility of building a compact base which may include a representation of a very large number of images, a more relevant search for similar images than the devices of the state of the art, taking into account geometrical elements of these images, and faster. These advantages are more particularly improved when the relevant base assumes the form of a structure of inverted lists.

The disclosure is not limited to the embodiment described above, only as examples. In particular:

The first, second and third operators may be embodied in a same operator having the same functionalities.

The first, second and third storage structures were illustrated as belonging to a same memory 3. However, it is understood that each of these structures may be localised or distributed over physically distinct or even technologically different devices. For example, the first memory structure may be laid out on a hard disk, while the second memory structure may be laid out in RAM memory, in particular when it is made in the form of a structure of inverted lists (compactness).

The first operator and the second and third operators may be used independently of each other, in particular in the second embodiment of the first operator.

The disclosure may also be considered as methods for assisting with recognition of images, the steps of which are found in the different embodiments described. These methods are capable of generalization according to the spirit of this description.

The processing device 5 may be made with any computing means, in particular a microprocessor capable of executing computer programme products.

The invention claimed is:

1. An assistance device for image recognition, comprising:
a memory configured for storing a plurality of sets of descriptors, each set corresponding to an image,
each descriptor being associated with a designated area of the image, and comprising first data of the vector type characteristic of said designated area of the image, second data of the angle type characteristic of said designated area of the image, and third data of the scalar type characteristic of said designated area of the image,
a first operator configured for receiving a designation of two descriptors and of establishing a Boolean variable reflecting a verification of a similarity criterion of the descriptor vectors, from a comparison between the first data of these descriptors,
a second operator configured for receiving a designation of two descriptors and of establishing a rotation angle parameter from the second respective data of both descriptors,
a third operator configured for receiving a designation of two descriptors and of establishing a scale factor parameter from the third data of these descriptors,
a controller configured for receiving the designations of a first set of descriptors corresponding to a first image and of a second set of descriptors corresponding to a second image, and laid out so as to apply the first operator to each pair formed by a descriptor of the first set, and by a descriptor of the second set, in order to infer therefrom a list of pairs of similar descriptors,
calling the second operator and the third operator for each of the pairs of descriptors of said list and storing in memory the whole of the obtained parameters, and
an estimator of the likeness between the images respectively corresponding to the first and to the second set of descriptors, from statistical processing on said set of parameters.

2. The device according to claim 1, wherein the second operator is laid out so as to establish the rotation angle parameter from the sole respective second data of both descriptors, and wherein the third operator is laid out so as to establish a scale factor parameter from the sole third data of these descriptors.

3. The device according to claim 1, wherein the memory comprises a storage structure storing in memory a matching relationship between each of the descriptors and a particular datum of a set of additional first data of the scalar type, selected according to a predetermined rule from the characteristic vector data of the descriptor.

4. The device according to claim 3, wherein the first operator is laid out so as to compare the first data of the descriptors at least partly designated on the basis of a comparison of said particular datum corresponding to said descriptors.

5. The device according to claim 3, wherein the storage structure is laid out so as to store in memory a matching relationship between each of the descriptors, the particular data selected for the descriptor, and a representation of at least some of the second and third data of this descriptor.

6. The device according to claim 5, wherein at least one of the second operator or of the third operator is laid out so as to establish the rotation angle parameter or the scale factor parameter from the representations of the second or third data in the specific memory structure.

7. The device according to claim 3, wherein the storage structure is laid out so as to store in memory a matching relationship between each of the particular data of the set of the first additional data and a designation datum of each of the descriptors for which this particular datum is selected, or a designation datum of this set of descriptors.

8. The device according to claim 7, wherein the storage structure is laid out as a plurality of lists, each of these lists being associated with a particular datum of the set of the first additional data and including said designation data as entries.

9. The device according to claim 8, wherein each of the entries further includes representation data of at least some of the second and third data of the designated descriptor.

10. The device according to claim 3, wherein the set of first additional data forms an index for the specific storage structure.

11. The device according to claim 1, wherein the rotation angle and scale factor parameters are stored as a set of pairs formed every time with a scale factor parameter value and a rotation angle parameter value, the memory further storing a matching relationship between each of the thereby formed pairs and an identifier of the descriptor of the second set from which this pair was established, or an identifier of the set of this descriptor.

12. The device according to claim 1, wherein the rotation angle and scale factor parameters are stored as sets of angle parameters and sets of scale factor parameters, the memory further storing a matching relationship between each of said sets and an identifier of the descriptor of the second set from which said values have been established, or an identifier of the set of this descriptor.

13. The device according to claim 1, wherein the rotation angle and scale factor parameters are respectively associated with classes of values, and wherein the estimator establishes a similarity measurement on the basis of statistical processing on the population of these classes of values.

14. The device according to claim 13, wherein the statistical processing comprises the application of a smoothing filter on the classes of values, prior to establishing the similarity measurement.

15. The device according to claim 1, wherein said statistical processing comprises the application of a weighting function for certain values of angle parameters and/or of scale factor parameters.

16. The device according to claim 1, wherein the memory stores a matching relationship between a designation of each of the descriptors and an integer value selected for this descriptor from a determined group of integer values from first data, and wherein said operator is laid out so that the similarity criterion of the vectors of descriptors comprises the identity of the assigned integer values.

17. The device according to claim 1, comprising a signature device, capable of receiving a descriptor, establishing fourth data of the multidimensional binary signature type, from the first data of the descriptor, the memory being laid out so as to maintain a matching relationship between an identifier of each of the descriptors, or an identifier of the set of this descriptor, and the fourth data established for this descriptor.

18. The device according to claim 17, wherein the first operator is laid out so as to obtain the binary signatures corresponding to both descriptors, and establishing a distance measurement from these binary signatures, and wherein the first operator is laid out so that said similarity criterion of the vectors of descriptors further comprises the fact that the obtained distance measurement is less than a first determined threshold value.

19. The device according to claim 17, wherein the signature device is laid out for:
    establishing a fifth data of the vector type, from a determined projection matrix and from the vector of the descriptor,
    comparing the values of each of the components of the projected vector with a determined second threshold value,
    establishing as a binary signature a set formed of Boolean variables, each Boolean variable reflecting the result of the comparison for a component of the projected vector.

20. The device according to claim 1, wherein the whole of the descriptors present in the memory are stored as a structure of inverted lists.

21. The device according to claim 8, further comprising a signature device, capable of receiving a descriptor, establishing a fourth data of the multidimensional binary signature type, from the first data of the descriptor, the memory being laid out so as to maintain a matching relationship between an identifier of each of the descriptors, or an identifier of the set of this descriptor, and the fourth data established for this descriptor.

22. The device according to claim 21, wherein each entry of the list further includes binary signature data.

* * * * *